(12) United States Patent
Grande et al.

(10) Patent No.: US 10,355,348 B2
(45) Date of Patent: Jul. 16, 2019

(54) OPTICALLY TRANSPARENT MICROWAVE POLARIZER BASED ON QUASI-METALLIC GRAPHENE

(71) Applicant: The United States of America as Represented by the Secretary of the Army, Washington, DC (US)

(72) Inventors: Marco Grande, Trani (IT); Giusseppe V Bianco, Bari (IT); Maria Antonietta Vincenti, Huntsville, AL (US); Domenico de Ceglia, Huntsville, AL (US); Pio Capezzuto, Bari (IT); Michael Scalora, Huntsville, AL (US); Antonella D'Orazio, Bari (IT); Giovanni Bruno, Adelphia (IT)

(73) Assignee: The United States of America as represented by the Secretary of the Army, Washington, DC (US)

( * ) Notice: Subject to any disclaimer, the term of this patent is extended or adjusted under 35 U.S.C. 154(b) by 150 days.

(21) Appl. No.: 15/717,391

(22) Filed: Sep. 27, 2017

(65) Prior Publication Data

US 2018/0097281 A1 Apr. 5, 2018

Related U.S. Application Data

(60) Provisional application No. 62/402,590, filed on Sep. 30, 2016.

(51) Int. Cl.
*H01Q 1/36* (2006.01)
*H01Q 15/22* (2006.01)
*C01B 32/194* (2017.01)
*H01Q 15/24* (2006.01)
*B82Y 20/00* (2011.01)
*H01Q 15/00* (2006.01)

(52) U.S. Cl.
CPC ........... *H01Q 1/368* (2013.01); *C01B 32/194* (2017.08); *H01Q 15/22* (2013.01); *H01Q 15/24* (2013.01); *B82Y 20/00* (2013.01); *H01Q 15/0013* (2013.01); *Y10S 977/734* (2013.01); *Y10S 977/952* (2013.01)

(58) Field of Classification Search
None
See application file for complete search history.

(56) References Cited

U.S. PATENT DOCUMENTS

| 2008/0018232 A1* | 1/2008 | Zhang | B82Y 10/00 313/498 |
| 2016/0189821 A1* | 6/2016 | Yoon | B82Y 30/00 156/238 |
| 2017/0088944 A1* | 3/2017 | Sultana | C23C 16/26 |

\* cited by examiner

*Primary Examiner* — John J Figueroa
(74) *Attorney, Agent, or Firm* — Michael K. Gray

(57) ABSTRACT

An optically transparent graphene-based wire-grid polarizer for operating at microwave frequencies (X band) has a glass substrate having multiple strips or layers of $SOCl_2$ doped graphene. The strips are separated by portions of the glass substrate such that the strips are arranged in parallel. The $SOCl_2$ doped graphene strips have a quasi-metallic quality allowing for the transmission of an electric field with horizontal polarization in the horizontal direction while reflecting the vertical portion of the electric field.

3 Claims, 6 Drawing Sheets

OPTICALLY TRANSPARENT MICROWAVE POLARIZER BASED ON QUASI-METALLIC GRAPHENE

BENEFIT OF PROVISIONAL APPLICATION

Benefit is claimed to provisional application No. 62/402,590 of the same title which was filed on Sep. 30, 2016 and is hereby incorporated by reference.

The invention described herein may be manufactured, used and licensed by or for the U.S. Government for U.S. Government purposes without payment of any royalties thereon.

BACKGROUND OF THE INVENTION

1. Field of the Invention

The invention generally relates to microwave polarizers. More particularly the invention pertains to a microwave polarizer utilising $SOCl_2$ doped graphene strips aligned in parallel.

2. Discussion of the Background

Graphene is a single atomic layer of graphite that consists of very tightly bonded carbon atoms organized into a hexagonal lattice. Graphene shows a planar configuration that leads to a total thickness of about 0.34 nm. This two-dimensional (2D) nature is responsible for the very exceptional electrical, mechanical and optical properties shown by this material. Currently, there are several types of "graphene" (i.e. mechanically exfoliated graphite, liquid-phase exfoliated graphite, reduced graphene oxide, vertically oriented graphene nanosheets, graphene synthesized by chemical vapor deposition, etc) which found potential application in specific technological fields.

Chemical Vapour Deposition (CVD) graphene has been prognosticated as the ideal conducting material for future 2D technologies. However, the most current and lowest reported experimental values of its sheet resistance (around 1000 $\Omega$/sq) literally invalidate any such prospects.

Microwave applications like, for example, optically transparent microwave antennas require graphene with sheet resistance in the quasi-metallic region. For suspended monolayer graphene this means a sheet resistance lower than a critical value ($\eta_0/2$, with $\eta_0$ corresponding to the impedance of free space) where microwave absorption is expected to be maximum. Up to now, graphene properties in the microwave range have been studied by means of theoretical models in contexts including coplanar waveguides, metallic rectangular waveguides and terahertz (THz) ethanol measurements. In most cases the sheet resistance falls in the lossy-dielectric region (values higher than $\eta_0/2$), which strongly affects the performance of any microwave device that requires metallic components.

In this regard, the transport properties of CVD graphene are determined by both intrinsic and extrinsic factors such as (i) its polycrystalline nature and (ii) the lack of reproducible methods that would allow its transferal to substrates of technological interest without generating holes, cracks and ripples, especially on large areas. These defects, as well as grain boundaries, act as barriers to charge transport and result in sheet resistance higher than that of mechanically exfoliated micrometer graphene. Indeed, the carrier mobility of CVD graphene (1000-3000 $cm^2V^{-1}s^{-1}$) is approximately one order of magnitude lower than the carrier mobility of the mechanically exfoliated graphene, if measured inside a large single CVD graphene grain. This suggests that the poor transport properties of CVD graphene are strongly correlated to the presence of structural defects in the carbon lattice (vacancies, substitutional impurities, and topological defects).

In theory, the use of multiple layers of CVD graphene acting as parallel resistances should amount to a simple method to lower the sheet resistance. However, experiments suggest that adding parallel CVD graphene layers does not necessarily decrease sheet resistance, since the partial contact or the presence of additional impurities (such as residual etchant and water molecules) contribute contact/series resistances between graphene layers.

SUMMARY OF THE INVENTION

The microwave polarizer of the present invention has a glass substrate with a plurality of $SOCl_2$ doped graphene layers or strips arranged on the glass substrate so as to form a sheet. The respective layers of the plurality of $SOCl_2$ doped graphene layers are separated by portions of the glass substrate such that the plurality of $SOCl_2$ doped graphene layers are in parallel with one another. The layers or strips have a quasi-metallic quality allowing for the transmission of electromagnetic waves with an electric field ($E_H$) that is horizontally polarized (i.e., $E_H$ is perpendicular to the strips' long axis) while reflecting waves with vertical polarization (i.e., waves with an electric field $E_V$ perpendicular to the strips' axis.

DESCRIPTION OF THE DRAWINGS

A more complete appreciation of the invention and many of the attendant advantages thereof will be readily obtained by reference to the following detailed description when considered in connection with the accompanying drawings.

DETAILED DESCRIPTION

Figure 1:
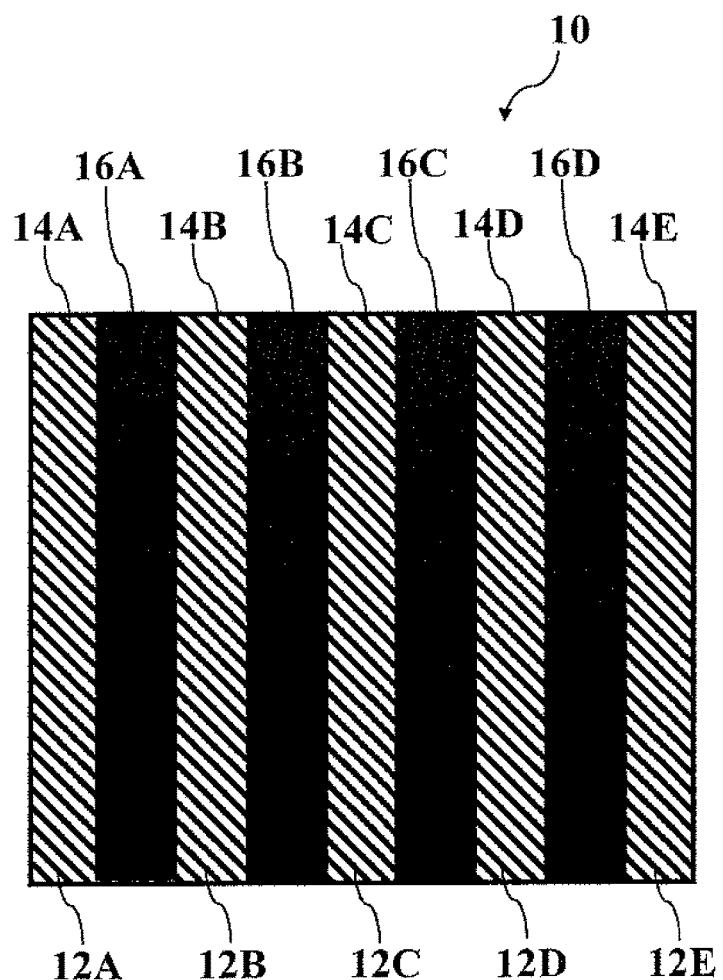
FIG. 1 is a top view of the graphene-based grid-polarizer of the present invention.

In FIG. 1 graphene-based grid-polarizer 10 has graphene strips 12A, 12B, 12C, 12D, and 12E positioned on a clear glass substrate 16. The widths of respective portions 16A, 16B, 16C, 16D of the glass substrate 16 separate the respective graphene strips 12A, 12B, 12C, 12D and 12E. The graphene strips are doped with $SOCl_2$. Reference numerals 14A, 14B, 14C, 14D and 14E indicate that graphene strips 12A, 12B, 12C, 12D and 12E contain $SOCl_2$ doping. The hole concentration for each graphene strip is greater than $10^{12}$ cm$^{-2}$.

Figure 2:
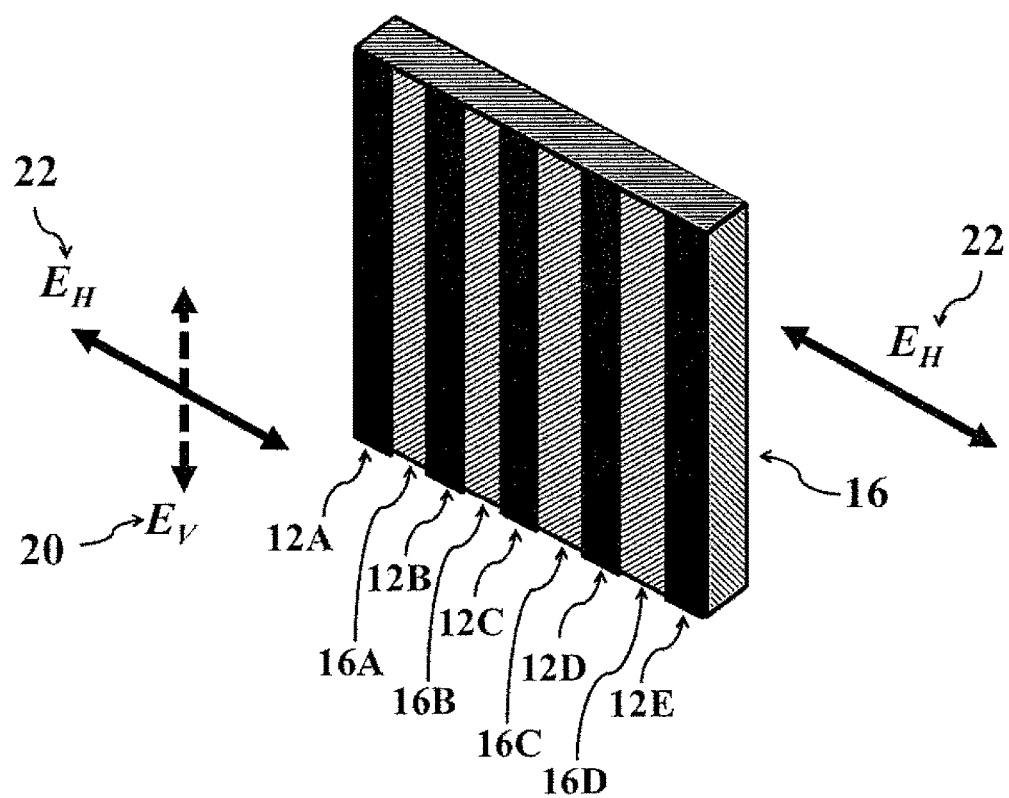
FIG. 2 is a perspective view of the graphene-based grid-polarizer of the present invention.

FIG. 2 gives further perspective of graphene strips 12A, 12B, 12C, 12D, and 12E being positioned on the clear glass substrate 16. The graphene-based grid-polarizer 10 transmits only the horizontal component 22 of the electric field with the vertical component of the electric field being filtered out.

Figure 3:
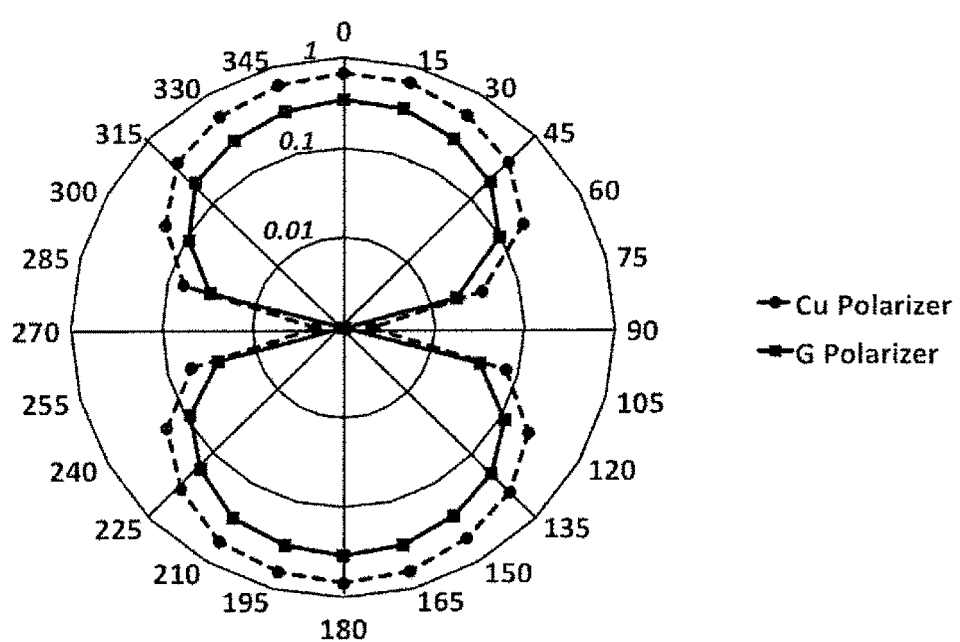
FIG. 3 is a graphical illustration which compares normalized transmittances of the graphene-based grid polarizer of the present invention with those of a copper-based polarizer.

FIG. 3 shows the normalized transmittance $(T_{90}-T_{pol})/T_{90}$ of the polarizer $T_{pol}$ with respect to transmission at 90° ($T_{90}$). This normalization emphasizes the difference at 0° (reflected signal). The graphene-based wire-grid polarizer 10 of the present invention shows a near-unity transmission at 90°.

FIG. 3 gives a graphical comparison of the graphene-based grid-polarizer 10 of the present invention with a prior art copper based polarizer. Normalized transmittance $(T_{90}-T_{pol})/T_{90}$ for the graphene-based polarizer (depicted with solid lines and squares) is compared with the normalized transmittance of the copper-based polarizer (depicted by dashed lines and circles) where $T_{90}$ and $T_{pol}$ are the transmittance at 90° and the polarizer transmittance, respectively.

Figure 4:
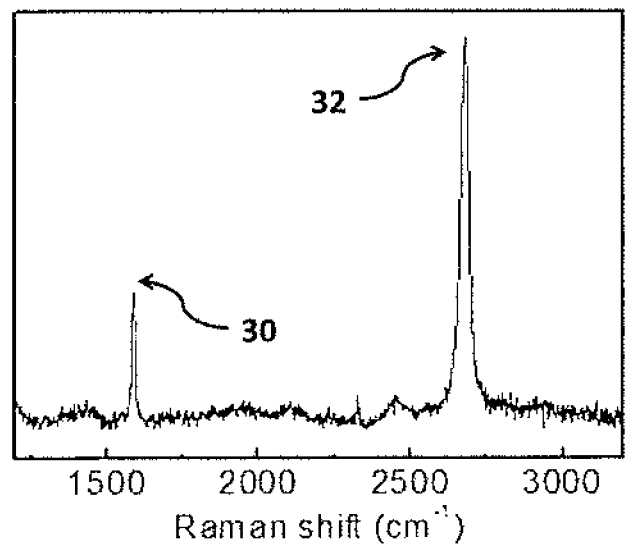
FIG. 4 is a graphical illustration showing the Raman spectrum in pristine CVD graphene.
Figure 5:
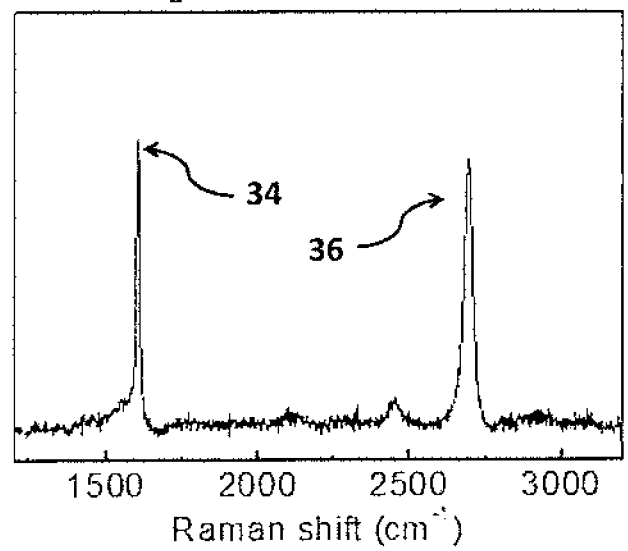
FIG. 5 is a graphical illustration showing the Raman spectrum in $SOCl_2$ doped graphene in accordance with the present invention.

In testing the present invention, the Raman spectrum of CVD graphene was compared before and after $SOCl_2$ treatment. In FIG. 4 the Raman spectrum of pristine CVD graphene is shown. FIG. 5 shows the Raman spectrum of $SOCl_2$ doped graphene in accordance with the present invention. Attention is made to the peaks 30 and 32 of the pristine CVD graphene and peaks 34 and 36 of the $SOCl_2$ doped graphene.

The hole-doping effect is clearly demonstrated by the red-shift of both the G and 2D peaks and by the increase of the ratio between their intensities. The absence of the D peak in the spectrum of the chemically-doped graphene attests to the absence of any breaking in the C-sp$^2$ lattice conjugation induced by the doping treatment. The interaction between $SOCl_2$ and graphitic materials occurs by removing hydroxyl and carboxyl functionalities, and by introducing both covalently and ionically bonded chlorine atoms. Moreover, the interaction with other $SOCl_2$/graphene reaction products, including $SO_2$, cannot be excluded.

Figure 6:
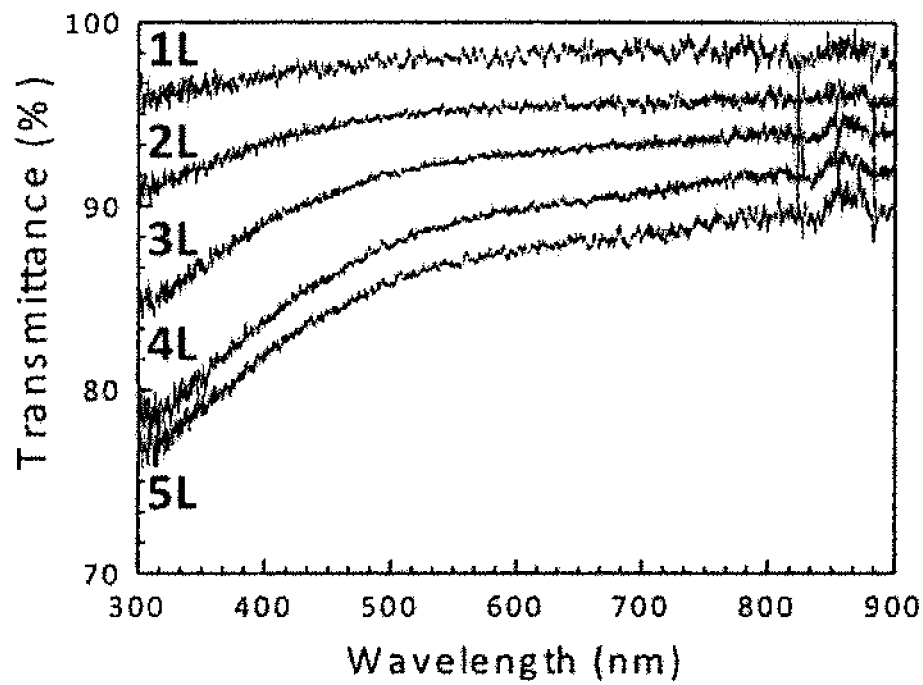
FIG. 6 is a graphical illustration demonstrating how the optical transmittance decreases as layers of $SOCl_2$ doped graphene are added (from 1 to 5 layers) in accordance with the present invention.

With reference to FIG. 6, the optical transmittance of chemically-doped graphene in accordance with the present invention is demonstrated as the chemically-doped graphene layers are progressively increased from one to five layers. No differences were found between the transmittance values of pristine and chemically-doped multilayer graphene. The higher absorbance found for three, four and five graphene layers are related mainly to residual impurities due to the transferal processes, and not to impurities introduced by $SOCl_2$ treatment.

Figure 7:
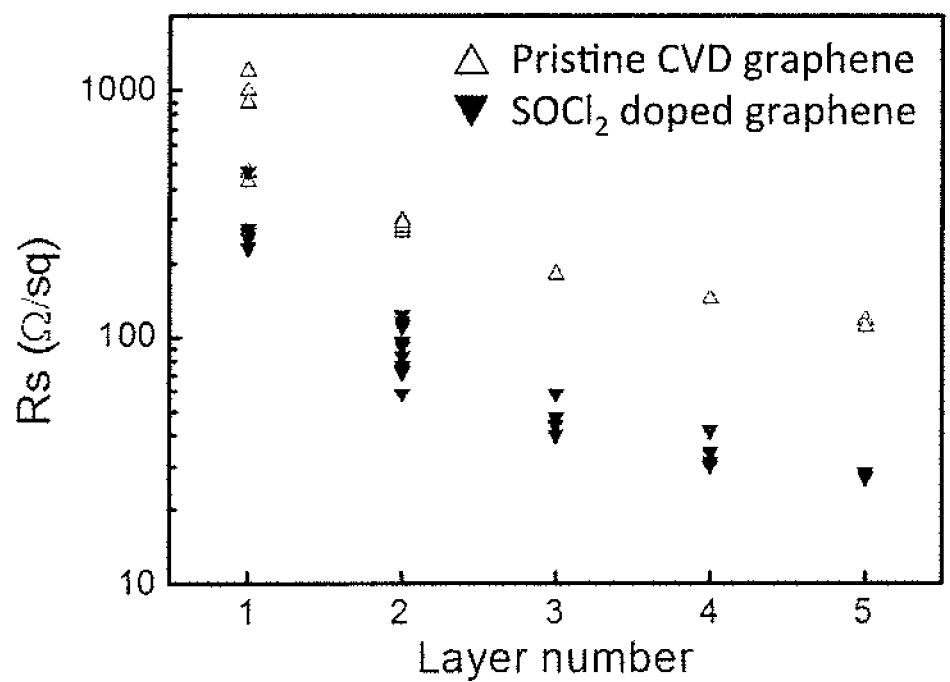
FIG. 7 is a graphical illustration showing sheet resistance as layers of $SOCl_2$ doped graphene are added in accordance with the present invention.

In FIG. 7, in accordance with the present invention, the effect of the combined use of $SOCl_2$ chemical doping and multilayer graphene in terms of sheet resistance is shown. In going from a monolayer or single strip to five layers or strips the sheet resistance $R_s$ of pristine CVD graphene monotonically decreases and plateaus to values larger than 100 Ω/sq (black solid squares). In contrast, chemically-doped graphene can overcome the low threshold limit with only two layers. The minimum sheet resistance value measured for chemically-doped graphene is 27 Ω/sq, and was achieved with five-layer graphene samples. If additional graphene layers are added, the effect of series resistances between adjacent graphene layers becomes predominant, resulting in higher $R_s$.

The very low sheet resistance of the present invention (quasi-metallic graphene) led to testing of the electromagnetic response of hole-doped graphene at microwave frequencies. In particular, reflectance, transmittance, and absorbance of samples with different sheet-resistances were measured. The measurements were carried out by means of a microwave setup consisting of a klystron connected to a WR90 rectangular waveguide (the waveguide supported only the $TE_{10}$ mode). A slotted-line acquired the electromagnetic power (square law) with a spatial resolution of 1 mm in the rectangular waveguide at 9 GHz (the guide wavelength is $\lambda_g$=48 mm, while the free-space wavelength is $\lambda_0$=33 mm).

That analysis is based on the measurement of the standing waves that originate in the rectangular waveguide from the discontinuity at one end of the waveguide. In order to validate the experimental protocol, the reflection coefficient Γ when the waveguide is either shorted with a metallic plate or open-ended was measured.

First the response of glass samples covered by graphene sheets with different sheet resistances was measured. The area covered by the doped graphene was about 3 cm×2 cm, allowing total coverage of the WR90 waveguide cross-section. It is noted that the thickness of the hole-doped graphene as used in the present invention is of the order of 1 nm, corresponding to $\sim\lambda/10^6$, thus confirming the two-dimensional nature of graphene at microwave frequencies.

Figure 8:
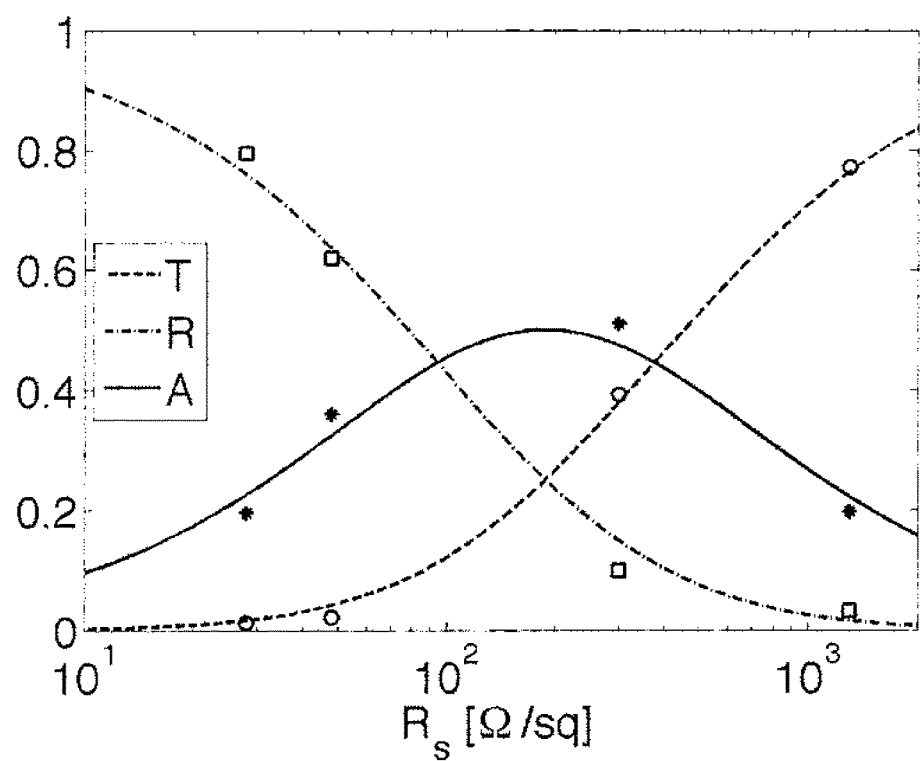
FIG. 8 is a graphical illustration showing analytical model lines for reflectance, transmittance and absorbance for the polarizer of the present invention with the analytical models being compared with actual experimental values when sheet resistance $R_s$ is varied in the range 10 $\Omega$/sq-2 k$\Omega$/sq.

FIG. 8 shows analytical model (lines) and experimental findings (symbols) for the reflectance $R_{GR}$ (dot-dashed, square), transmittance $T_{GR}$ (dashed, circle) and absorbance $A_{GR}$ (solid, asterisk) when sheet resistance $R_s$ is varied in the range 10 Ω/sq-2 kΩ/sq. (The x-axis of FIG. 8 is in logarithm scale). The maximum absorbance (obtained considering $R_s$=$n_0$/2 where $n_0$ is the vacuum impedance) separates the quasi-metallic region ($R_s$<$n_0$/2) from the lossy-dielectric region ($R_s$>$n_0$/2). The reflectance and transmittance were measured by means of a microwave setup operating at 9 GHz.

As FIG. 8 demonstrates, the comparison between the analytical models and the experimental results shows very good agreement.

The analytical models can be formulated by considering the boundary conditions at the interface z=0, between two (semi-infinite) media (impinging from medium 1 to medium 2), that introduces a finite sheet conductivity $\sigma_{2D}$ this can be expressed as:

$$\bar{n}\times(\bar{E}_1-\bar{E}_2)|_{z=0}=0$$

$$\bar{n}\times(\bar{H}_1-\bar{H}_2)|_{z=0}=\bar{J}_s=s_{2D}\bar{E} \quad (Eq. 1)$$

Where $n_1$ and $n_2$ are the wave impedances in the two media, respectively, and $\bar{J}_s=s_{2D}\bar{E}$ corresponds to Ohm's law.

When graphene is considered in the microwave regime, the graphene sheet conductivity can be approximated by the DC sheet conductivity, i.e. $s_{2D}\approx s_{DC}=1/R_s$. Moreover, the sheet conductivity is independent over a wide frequency range. At the same time, the graphene sheet may be considered as an interface (current sheet) between two media, since its thickness is $\sim\lambda/10^6$ at microwave frequencies. Applying the boundary conditions for the electric and magnetic fields at the interface z=0 gives:

$$1 + \Gamma = T \quad \text{(Eq. 2)}$$
$$\frac{1}{n_1} - \frac{\Gamma}{n_1} - \frac{T}{n_2} = s_{2D}T$$

where $\Gamma$ and $T$ are the reflection and transmission coefficients, respectively.

Solving the Equation 2 yields to:

$$\Gamma = \frac{1+s}{1-s} \quad \text{(Eq. 3)}$$
$$T = \frac{2}{1+s}$$

where $$s = \frac{n_1}{n_2}(1 + s_{2D}n_2).$$

Reflection and transmission coefficients allow calculation of reflectance $R_{GR}$ and transmittance $$T_{GR}, |\Gamma|^2 \text{ and } \frac{n_1}{n_2}|T|^2,$$

respectively, while absorbance $A_{GR}$ may be evaluated as $A_{GR}=1-R_{GR}-T_{GR}$. Assuming $n_1=n_2=n_0$ (where $\eta_0$ corresponds to the impedance of free space) it is possible to define two different regions for a single graphene sheet: the lossy-dielectric region $$\left(R_s > \frac{n_0}{2}\right)$$

and the quasi-metallic region $$\left(R_s < \frac{n_0}{2}\right),$$

where $$R_s = \frac{n_0}{2}$$

defines the sheet resistance that corresponds to the absorbance maximum.

For the present invention, the maximum achievable absorption with the doped graphene sheet was found equal to 50%, while the graphene in the quasi-metallic region acts as a metal by efficiently reflecting the impinging electromagnetic field. For example, when $R_s=27$ Ω/sq the reflectance is larger than 80%. At the same time, the doped graphene sheet conductivity is independent over a wide frequency range which makes the results reported in FIG. 8 also relatively frequency-independent, and may consequently be applied to other regions of the spectrum.

The graphene used in the prototype of the present invention was grown by chemical vapor deposition methodology using copper foils (thickness ranging from 15 to 50 μm) as substrates and $CH_4$ as gaseous carbon precursors. Copper substrates were annealed at 1000° C. in a $CH_4$ and $H_2$ atmosphere (with a $CH_4/H_2$ ratio going from 99/1 to 1/99) and a total gas pressure of 1-100 mbar. The annealing of copper substrates was carried out for a time ranging from 10 to 200 minutes in order to achieve the complete coverage of the copper substrate by graphene.

Then, the fabricated copper/graphene samples were cooled, exposed to air, and covered by thermal tape. These copper/graphene/thermal tape samples were dipped in a solution of ammonium persulfate until the complete etching of the copper substrates.

Finally, the transfer of graphene on corning glass substrates was performed by pressing the graphene/tape samples to the corning substrates (treated by $O_2$ plasma to improve graphene adhesion). Then, these corning/graphene/thermal tape samples were heated for detaching the thermal tape that loses its adhesive properties at temperatures above 100° C. Additional transfer steps were performed on graphene/corning samples for fabricating multilayer graphene samples.

$SOCl_2$ treatments were performed in a dry chamber by placing graphene/glass substrate and 1 mL of liquid $SOCl_2$ (avoiding direct contact) at 105° C. for 60 min. Doping of multilayer samples was performed by repeating $SOCl_2$ treatment after transferring and stacking each graphene layer.

Sheet resistance measurements were carried out using four-point contacts geometry in the Van der Pauw configuration on a sampled area of 4×4 mm² in air and at room temperature.

The chemically-optimized graphene was exploited to realize a graphene-based wire-grid polarizer, by superimposing four graphene strips. Using this procedure achieved a minimum sheet resistance of 50 Ω/sq (quasi-metallic region) in the strips over an area of about 50×55 mm² (FIG. 2). The presence of quasi-metallic strips allows the transmission of the electric field ($E_H$) with horizontal polarization 22 in the horizontal direction, while the electric field ($E_V$) with vertical polarization 20 is reflected (FIG. 2).

In order to verify its behavior in terms of polarization, the graphene-based wire-grid polarizer was placed in between two horn pyramidal antennas with a mutual distance larger than that the Fraunhofer distance, thus allowing operation in the far-field. The device was placed on a plastic goniometer ($\Delta\theta$ step was set at 15°) and the transmitted signal was normalized with respect to a reference structure (glass substrate without graphene).

A comparison was made of the graphene-based wire-grid polarizer 10 of the present invention with a wire-grid polarizer made with copper stripes of identical dimensions (5 mm width) and identical foot-print with respect to the graphene-based polarizer.

The comparison reveals that the two polarizers only show a constant 3 dB difference over the entire angular range while their angular behavior is identical, (see, FIG. 3). This result is quite remarkable, considering that the copper layer is 35 μm thick, while graphene thickness is about 1 nm.

The present invention in combining the use of $SOCl_2$ chemical doping with multiple layers of graphene can reduce material sheet resistance down to 30 Ω/sq while optical transparency remains above 85%.

Also, it should be emphasized that dimensions of the sheet of the present invention (i.e., substrate with parallel strips of doped graphene) can range in size from a few cm² to several m² with the number of strips ranging from four to multiple, multiple quantities of strips.

The present invention has many uses. Various modifications and embodiments of the invention may be made by those skilled in the art without departing from the scope and spirit of the foregoing disclosure. Accordingly, the scope of the invention is limited only by the following claims.

What is claimed is:

1. A microwave polarizer, comprising:
    a glass substrate;
    a plurality of $SOCl_2$ doped graphene layers, and wherein:
    said plurality of $SOCl_2$ doped graphene layers is arranged on the top of said glass substrate so as to form a sheet and are separated by portions of said glass substrate such that said plurality of $SOCl_2$ doped graphene layers are in parallel with one another; and
    wherein each layer of said plurality of $SOCl_2$ doped graphene layers is about 1 nm thick, said plurality of $SoCl_2$ doped graphene layers comprises at least four $SOCl_2$ doped graphene layers, and each layer of said plurality of $SOCl_2$ doped graphene layers has a hole concentration greater than $10^{12}$ cm$^{-2}$.

2. A microwave polarizer according to claim 1, wherein:
    the sheet formed by said plurality of $SoCl_2$ doped graphene layers and said glass substrate has a sheet resistance $R_s$ range between 10 Ω/sq and 2 kΩ/sq.

3. A microwave polarizer according to claim 1, wherein:
    said plurality of $SoCl_2$ doped graphene layers have a quasi-metallic quality allowing for the transmission of an electric field with horizontal polarization in the horizontal direction while reflecting a vertical electric field.

* * * * *